(12) United States Patent
Chen et al.

(10) Patent No.: US 9,893,950 B2
(45) Date of Patent: Feb. 13, 2018

(54) SWITCH-CONNECTED HYPERX NETWORK

(71) Applicant: International Business Machines Corporation, Armonk, NY (US)

(72) Inventors: Dong Chen, Scarsdale, NY (US); Philip Heidelberger, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/007,642

(22) Filed: Jan. 27, 2016

(65) Prior Publication Data
US 2017/0214579 A1 Jul. 27, 2017

(51) Int. Cl.
*H04L 12/28* (2006.01)
*H04L 12/24* (2006.01)

(52) U.S. Cl.
CPC ................. *H04L 41/12* (2013.01)

(58) Field of Classification Search
None
See application file for complete search history.

(56) References Cited

U.S. PATENT DOCUMENTS

| | | | | | |
|---|---|---|---|---|---|
| 4,868,818 A | * | 9/1989 | Madan | ............... | G06F 11/0757 714/10 |
| 5,271,014 A | * | 12/1993 | Bruck | ............... | G06F 11/2051 714/4.1 |
| 5,642,524 A | * | 6/1997 | Keeling | ............... | G06F 15/803 712/12 |
| 6,437,804 B1 | * | 8/2002 | Ibe | ............... | G06F 17/509 709/223 |
| 7,486,619 B2 | * | 2/2009 | Chen | ............... | H04L 49/1576 370/235 |
| 8,830,873 B2 | * | 9/2014 | Tomic | ............... | H04L 12/462 370/255 |

(Continued)

FOREIGN PATENT DOCUMENTS

| | | |
|---|---|---|
| EP | 0488633 A2 | 6/1992 |
| EP | 2417598 | 2/2012 |
| WO | 2010117912 A1 | 10/2010 |

OTHER PUBLICATIONS

Radhakrishnan, et al, "Dahu: commodity switches for direct connect data center networks" In Proceedings of the ninth ACM/IEEE symposium on Architectures for networking and communications systems, Oct. 21-22, 2013, pp. 59-70, IEEE Press, San Jose, CA, USA.

(Continued)

*Primary Examiner* — Willie J Daniel, Jr.
(74) *Attorney, Agent, or Firm* — Scully, Scott, Murphy & Presser, P.C.; Daniei P. Morris, Esq.

(57) ABSTRACT

A network system includes a plurality of sub-network planes and global switches. The sub-network planes have a same network topology as each other. Each of the sub-network planes includes edge switches. Each of the edge switches has N ports. Each of the global switches is configured to connect a group of edge switches at a same location in the sub-network planes. In each of the sub-network planes, some of the N ports of each of the edge switches are connected to end nodes, and others of the N ports are connected to other edge switches in the same sub-network plane, other of the N ports are connected to at least one of the global switches.

16 Claims, 15 Drawing Sheets

(56) References Cited

U.S. PATENT DOCUMENTS

| | | | |
|---|---|---|---|
| 2001/0021187 A1 | 9/2001 | Saeki et al. | |
| 2002/0085011 A1* | 7/2002 | Choi | G06F 17/30017 345/557 |
| 2004/0141683 A1 | 7/2004 | Hsu | |
| 2005/0132163 A1 | 6/2005 | Stockmeyer | |
| 2005/0195808 A1 | 9/2005 | Chen et al. | |
| 2008/0151863 A1* | 6/2008 | Lawrence | H04L 49/15 370/351 |
| 2009/0024829 A1* | 1/2009 | Deng | G06F 15/17337 712/12 |
| 2012/0324068 A1* | 12/2012 | Jayamohan | H04L 49/15 709/222 |
| 2013/0125097 A1* | 5/2013 | Ebcioglu | G06F 17/5045 717/136 |
| 2014/0236558 A1* | 8/2014 | Maliassov | G01V 99/00 703/10 |
| 2014/0314099 A1* | 10/2014 | Dress | H04L 45/62 370/422 |

OTHER PUBLICATIONS

Xiang, D., "Deadlock-free adaptive routing in meshes with fault-tolerance ability based on channel overlapping", IEEE Transactions on Dependable and Secure Computing, Jan.-Feb. 2011, pp. 74-88, vol. 8, No. 1.

* cited by examiner

SWITCH-CONNECTED HYPERX NETWORK

STATEMENT OF GOVERNMENT RIGHTS

This invention was made with government support under Contract No. 7078416 awarded by the Department of Energy. The Government has certain rights in this invention.

BACKGROUND

The present invention relates to a switch-connected HyperX network system, and more particularly to, a large-scale switch-connected network system including multiple HyperX network planes and a method for building the large-scale switch-connected network system.

Two-dimensional (2D) all-to-all connected network such as HyperX network topologies have a low diameter and a good all-to-all communication bandwidth. It exploits all-to-all wiring to achieve these benefits with low cost. For example, such 2D HyperX network topologies can be used by a large single multiprocessor (SMPs) such as Power8® (registered trademark of International Business Machines Corporation) 16 socket SMPs.

There are several limiting issues in deploying a network system with the 2D HyperX network topology. In a high-performance computing (HPC) system, compute resources are typically running partitioned. The all-to-all connected network system can be divided into multiple partitions used for different jobs. For example, when the all-to-all connected network system is divided into 2 equally-sized partitions for different independent jobs, half of the original all-to-all links may become inter-partition idle links. As a result, half of the network bandwidth will be lost. These inter-partition links may be used for intra-partition communication by means of indirect routing, however this may cause undesirable inter-job interference.

In addition, with the all-to-all connected network system, there may be limitation in scaling up a network size by adding new nodes and switches to the existing all-to-all network system. To add a new component (e.g., node, switch, and network plane), the existing components may be rewired to maintain the all-to-all wiring.

SUMMARY OF THE INVENTION

Aspects of the present invention are a system and a method for building a large-scale network by interconnecting multiple network planes via global switches. Exemplary embodiments of the present invention include a system and a method for increasing scalability and partitionability of baseline network without rewiring existing network connections.

According to an exemplary embodiment of the present invention, a network system is provided. The network system includes a plurality of sub-network planes and global switches. The sub-network planes have a same network topology as each other. Each of the sub-network planes includes edge switches. Each of the edge switches has N ports. Each of the global switches is configured to connect a group of edge switches at a same location in the sub-network planes. In each of the sub-network planes, some of the N ports of each of the edge switches are connected to end nodes, and others of the N ports are connected to other edge switches in the same sub-network plane, and others of the N ports are connected to at least one of the global switches.

According to an exemplary embodiment of the present invention, a network system is provided. The network system includes a plurality of HyperX network planes and first through L-th global switches (where L is an integer of at least two). Each HyperX network plane has an i×j grid of edge switches (where i and j are integers of at least two). The first global switch is connected to a group of first edge switches at a same location in the HyperX network planes. In each of the HyperX network planes, the first edge switch has a direct link with an edge switch in each of column and row directions with respect to the first edge switch.

According to an exemplary embodiment of the present invention, a method for building up a network system by interconnecting a plurality of HyperX network planes is provided. The method includes building the plurality of HyperX network planes by connecting a group of first edge switches at a same location in the HyperX network planes to a first global switch. Each of the HyperX network plane includes i×j grid of edge switches. Links between the edge switches in each column direction of the i×j grid are interconnected in an all-to-all manner, and links between the edge switches in each row direction of the i×j grid are interconnected in an all-to-all manner.

In an exemplary embodiment, each of the sub-network planes may include a HyperX network topology.

In an exemplary embodiment, a maximum number of the sub-network planes that can be interconnected in the network system may be equal to or smaller than a number of ports of each global switch.

In an exemplary embodiment, the network system may be partitioned by a unit of at least one sub-network plane.

In an exemplary embodiment, the network system may be scaled up by interconnecting a new sub-network plane having a same network topology as each of the sub-network planes. Each edge switch of the new sub-network plane may be connected to the at least one of the global switches of the network system.

BRIEF DESCRIPTION OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1A:
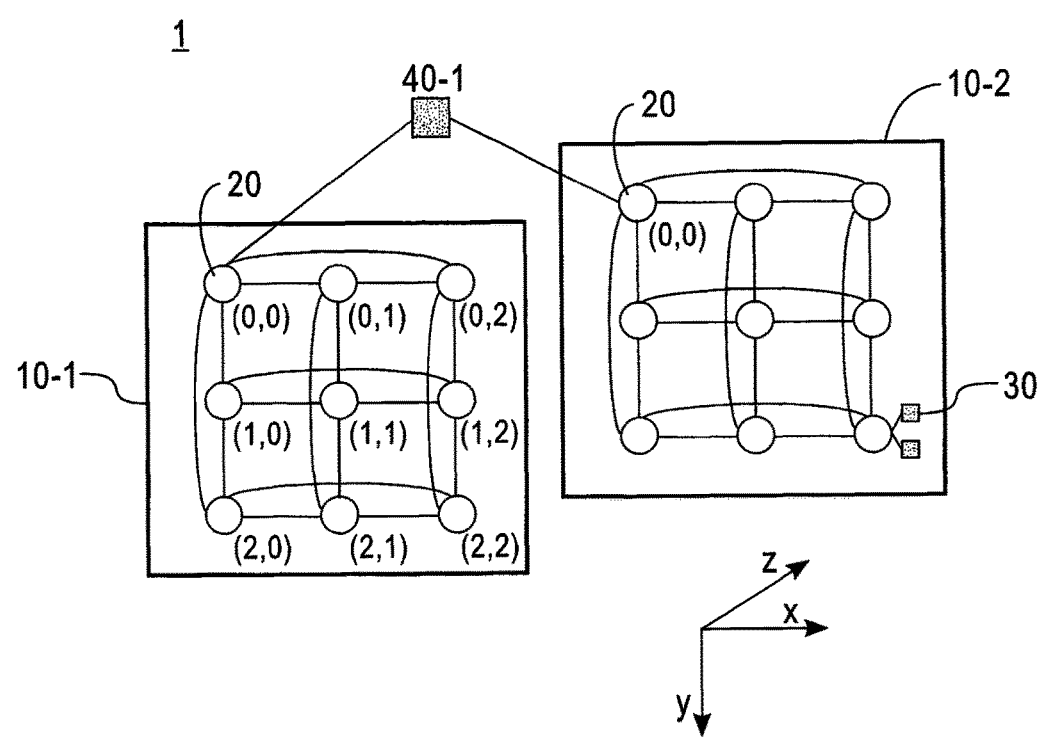
FIGS. 1A and 1B are diagrams illustrating a large-scale network system built by interconnecting multiple HyperX network planes according to an exemplary embodiment of the present invention.

Like reference numerals may refer to like elements throughout the written descriptions and drawings.

Figure 1B:
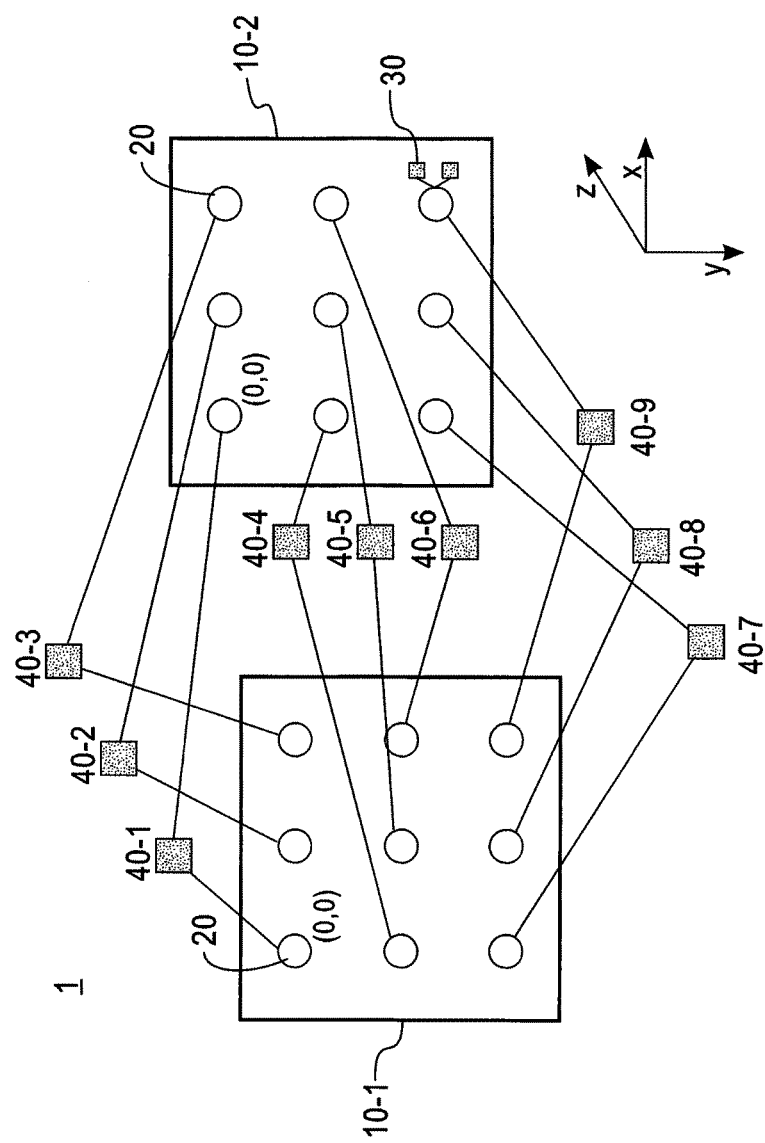

FIGS. 1A and 1B are diagrams illustrating a large-scale network system built by interconnecting multiple HyperX network planes according to an exemplary embodiment of the present invention.

Referring to FIGS. 1A and 1B, the large-scale network system 1 according to an exemplary embodiment of the present invention includes a plurality of HyperX network planes 10-1 and 10-2. For simplicity sake, it is assumed that the number of HyperX network planes to be interconnected is two, and each of the HyperX network planes has a two-dimensional (2D) 3×3 grid of edge switches. However exemplary embodiments of the present invention are not limited thereto.

Each of the HyperX network planes 10-1 and 10-2 includes edges switches 20, global switches 40-1 to 40-9, and links therebetween. Each of the edge switches 20 may have N ports. In an exemplary embodiment, each edge switch 20 may be an infiniband switch with 36 ports (e.g., N≥36). Each global switch may have M ports. In an exemplary embodiment, M may be equal to N.

In such 3×3 grid of the edge switches 20 of each of the HyperX network planes 10-1 and 10-2, edge switches 20 in each row are all-to-all connected. For example, in a first row, edge switches 20 with (0,0) and (0,1) coordinates have a direct link to each other, edge switches 20 of (0,1) and (0,2) coordinates have a direct link to each other, and edge switches 20 of (0,0) and (0,2) coordinates have a direct link to each other, and thus, the edge switches 20 in the first row are all-to-all connected. Similarly, edge switches 20 in each of second and third rows are all-to-all connected.

In addition, edge switches 20 in each column are all-to-all interconnected. For example, in a first column, edge switches 20 of (0,0) and (1,0) coordinates have a direct link to each other, edge switches 20 of (1,0) and (2,0) coordinates have a direct link to each other, and edge switches 20 of (0,0) and (2,0) coordinates have a direct link to each other, and thus, the edge switches 20 in the first column are all-to-all connected. Similarly, edge switches 20 in each of second and third columns are all-to-all connected.

In addition, edge switches 20 located in different row and column (e.g., located to face in a diagonal direction each other) may not be connected.

Each edge switch 20 is connected to end nodes 30. The end nodes 30 may include compute nodes and input/output (I/O) nodes.

In FIGS. 1A and 1B, although only one of the edge switches 20 is illustrated to be wired to the end nodes 30 for simplicity sake, each of the edge switches 20 in FIGS. 1A and 1B is wired to corresponding end nodes 30.

In an exemplary embodiment, some e.g., N/X1) of the N ports of each edge switch 20 are assigned for connection to end nodes 30, some others (e.g., N/X2) of the N ports are assigned for connection to other edge switches 20 along X-domain (e.g., along a row direction) of the 3×3 grid, still some others (e.g., N/X3) of the N ports are assigned for connection to other edge switches 20 along Y-domain (e.g., along a column direction) of the 3×3 grid, and still some others (e.g., N/X4) of the N ports are assigned for connection to at least one global switch along Z-domain of the 3×3 grid. Here, X1, X2, X3, and X4 are positive integers of at least two. For example, X1, X2, X3, and X4 may be 4, and thus, each edge switch 20 may be connected and communicate with N/4 end nodes, N/4 other edge switches 20 along X-domain, N/4 other edge switches 20 along Y-domain, and at least one global switch (e.g., 40-1) along Z-domain.

As shown in FIG. 1A, the edge switches 20 positioned at corresponding (0,0) coordinates in the first and second HyperX network planes 10-1 and 10-2 are connected to each other through the global switch 40-1.

In addition, as shown in FIG. 1B, the edge switches 20 positioned at corresponding (0,1) coordinates in the HyperX network planes 10-1 and 10-2 are connected to each other through the global switch 40-2, the edge switches 20 positioned at corresponding (0,2) coordinates in the HyperX network planes 10-1 and 10-2 are connected to each other through the global switch 40-3, the edge switches 20 positioned at corresponding (1,0) coordinates in the HyperX network planes 10-1 and 10-2 are connected to each other through the global switch 40-4, the edge switches 20 positioned at corresponding (1,1) coordinates in the HyperX network planes 10-1 and 10-2 are connected to each other through the global switch 40-5, the edge switches 20 positioned at corresponding (1,2) coordinates in the HyperX network planes 10-1 and 10-2 are connected to each other through the global switch 40-6, the edge switches 20 positioned at corresponding (2,0) coordinates in the HyperX network planes 10-1 and 10-2 are connected to each other through the global switch 40-7, the edge switches 20 positioned at corresponding (2,1) coordinates in the HyperX network planes 10-1 and 10-2 are connected to each other through the global switch 40-8, and the edge switches 20 positioned at corresponding (2,2) coordinates in the HyperX network planes 10-1 and 10-2 are connected to each other through the global switch 40-9. In FIGS. 1A and 1B, links among the edge switches 20 in each HyperX network plane 10-1 or 10-2 are omitted for simplicity sake.

For example, a total number of the global switches required to interconnect the HyperX network planes 10-1 and 10-2 each having 9 (e.g., 3×3 grid) edge switches may be 9. Thus, considering that there is P×Q grid of edge switches in each plane (here P and Q are integers at least two), a total number of the global switches required to interconnect the HyperX network planes may be equal to or greater than a multiplication result of P and Q (e.g., a total number of edge switches in each plane; P×Q).

The network system 1 according to an exemplary embodiment of the present invention is built by interconnecting edge switches 20 at the same location in the HyperX network planes 10-1 and 10-2 through each of the global switches 40-1 to 40-9. For example, referring to FIG. 1B, the HyperX network planes 10-1 and 10-2 are interconnected through the global switches 40-1 to 40-9 such that a group of edge switches 20 with the same location (e.g., corresponding (0,0) coordinates) in the HyperX network planes 10-1 and 10-2 is interconnected to a same global switch (e.g., 40-1).

Figure 2A:
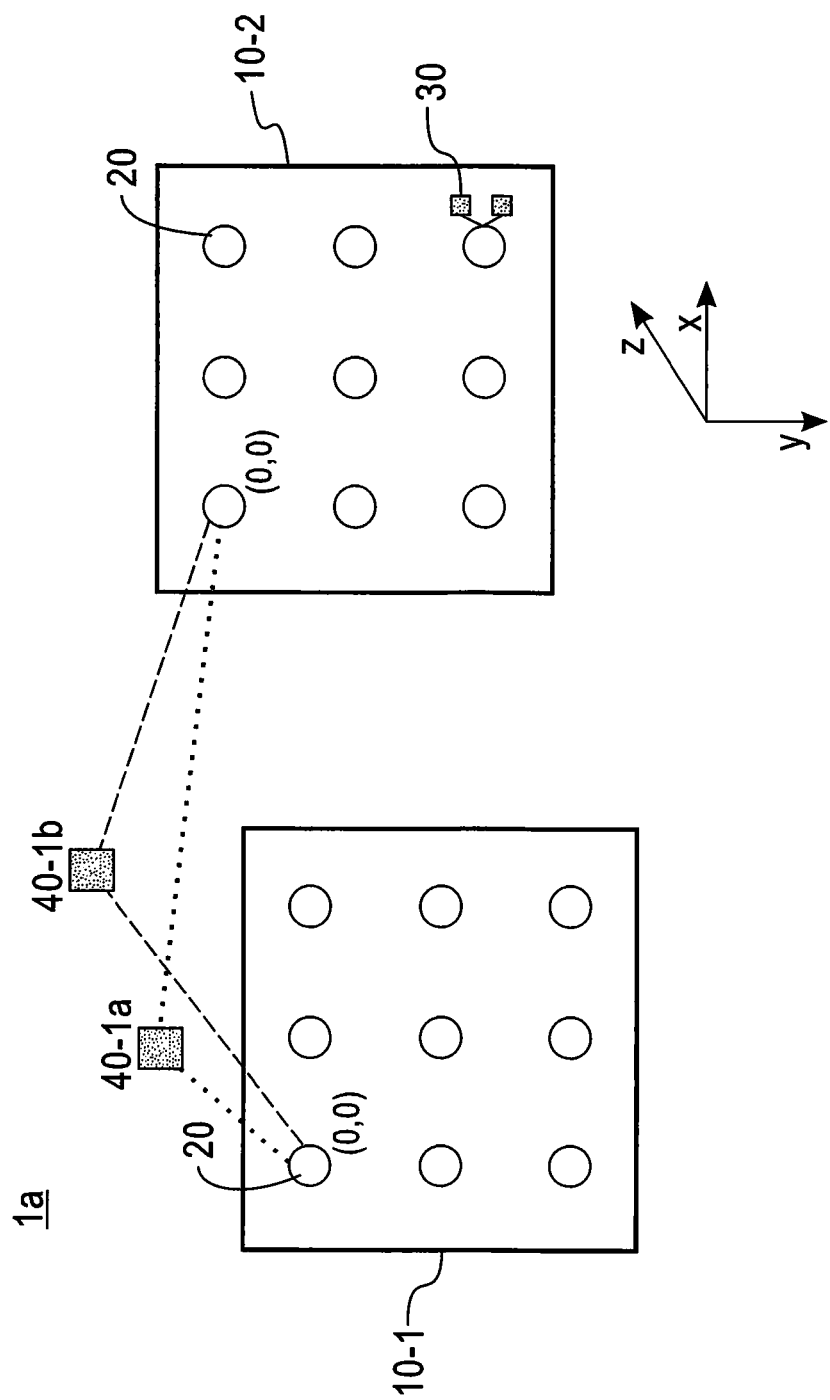
FIGS. 2A and 2B are diagrams illustrating an example in which an edge switch is connected to two global switches according to an exemplary embodiment of the present invention.
Figure 2B:
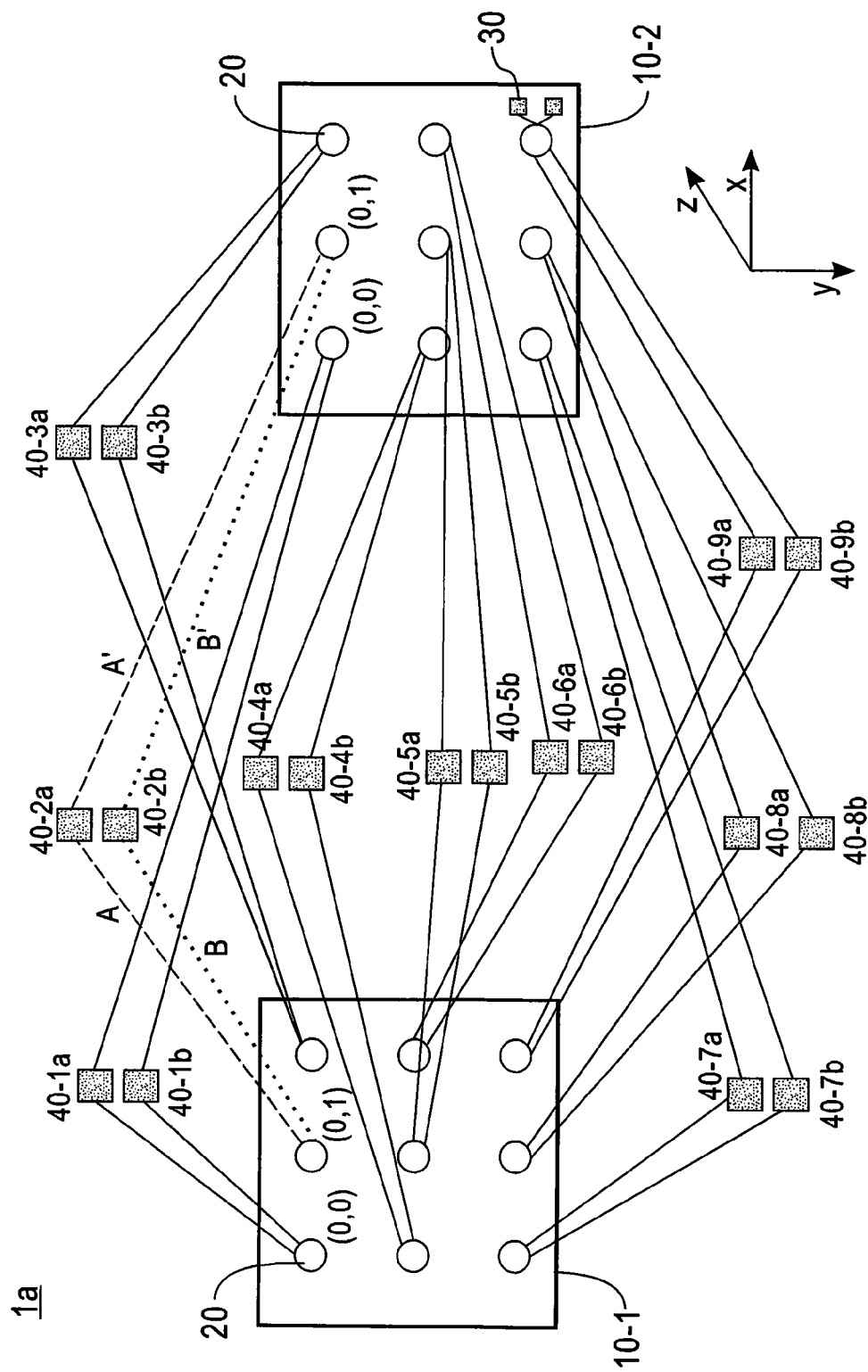

FIGS. 2A and 2B are diagrams illustrating an example in which an edge switch is connected to two global switches according to an exemplary embodiment of the present invention. In a network system 1a of FIG. 2A, the edge switches 20 with corresponding (0,0) coordinates in the HyperX network planes 10-1 and 10-2 are connected to the global switches 40-1a and 40-1b. Thus, more bandwidth and more alternative routing paths may be provided through the connection between the global switches 40-1a 40-1b and the edge switches 20 at (0,0) coordinates. More generally, there is P×Q grid of edge switches in each plane and in links from each edge switch to global switches at the same coordinate, then there are a total of m×P×Q global switches. For example, in FIG. 2B, m=2, P=Q=3, so there are 18 global switches.

In an exemplary embodiment, the global switch 40-1a or 40-1b may be any one of the global switches 40-2 to 40-9 of FIG. 1B. For example, the edge switches of (0,0) coordinates are connected, but are not limited, to the global switches 40-1a and 40-1b.

In addition, the edge switches 20 positioned at each of the coordinates (e.g., (0,1), (0,2), (1,0), (1,1), (1,2), (2,0), (2,1), or (2,2)) other than the coordinates (0,0) are connected to each other through at least two global switches. As shown in FIG. 2B, the edge switches 20 positioned at corresponding (0,1) coordinates in the HyperX network planes 10-1 and 10-2 are connected to each other through the global switches 40-2a and 40-2b. Lines A-A' and B-B' in FIG. 2B illustrate the connections between the edge switches of (0,1) and the global switches 40-2a and 40-2b, respectively. In addition, the edge switches 20 positioned at corresponding (0,2) coordinates in the HyperX network planes 10-1 and 10-2 are connected to each other through the global switches 40-3a and 40-3b, the edge switches 20 positioned at corresponding (1,0) coordinates in the HyperX network planes 10-1 and 10-2 are connected to each other through the global switches 40-4a and 40-4b, the edge switches 20 positioned at corresponding (1,1) coordinates in the HyperX network planes 10-1 and 10-2 are connected to each other through the global switches 40-5a and 40-5b, the edge switches 20 positioned at corresponding (1,2) coordinates in the HyperX network planes 10-1 and 10-2 are connected to each other through the global switches 40-6a and 40-6b, the edge switches 20 positioned at corresponding (2,0) coordinates in the HyperX network planes 10-1 and 10-2 are connected to each other through the global switches 40-7a and 40-7b, the edge switches 20 positioned at corresponding (2,1) coordinates in the HyperX network planes 10-1 and 10-2 are connected to each other through the global switches 40-8a and 40-8b, and the edge switches 20 positioned at corresponding (2,2) coordinates in the HyperX network planes 10-1 and 10-2 are connected to each other through the global switches 40-9a and 40-9b.

A size and scalability of the network system 1 may depend on the number of M ports of each global switch and the number of N ports of each edge switch. The size of the network system may be understood to mean a total number of end nodes connected in the system. In particular, the network system (e.g., 1 or 1a) according to an exemplary embodiment of the present invention has high scalability since the network size can readily be increased by adding new HyperX network planes as long as there are unused ports on the global switch, without rewiring or changing the existing network system. The number of network planes to be interconnected for the large-scale network system may be upper-limited by the number of M ports of each global switch.

Initially, the network system can be built with less than an upper limit number of HyperX network planes, and more HyperX network planes can be added afterward to increase the network size until the number of HyperX network planes reaches the upper limit, without making any changes on the existing wirings.

In an exemplary embodiment described with reference to FIGS. 1A and 1B, each global switch (e.g., 40-1) is connected to a single edge switch 20 (e.g., at (0,0) coordinates per each HyperX network plane, and thus, the global switch spends a single port out of the M ports of the global switch for connection with the edge switch for each network plane. The upper limit number of HyperX network planes that can be interconnected through the global switch may be M.

In an exemplary embodiment, when each edge switch 20 has N ports and the optimal allocation of the edge switch port 20 is such that N/4 ports for connection with end nodes 30, N/4 ports for X-dimension all-to-all connection, N/4 ports for Y dimension all-to-all connection, and N/4 ports for connection with global switches in Z dimension (e.g., 36≤N≤64 are realistic values of N, with N=36 or N=48 being used in commonly deployed switches). In this case, the maximum network size may be $(N/4)^3 * M$ (here, the symbol '*' denotes multiplication). For example, when N is 36 and M is the number of ports in the global switches where M=N, the network system 1 according to an exemplary embodiment of the present invention can be scaled up to 26,244 nodes, which is large enough for most super computer systems.

In an exemplary embodiment described with reference to FIG. 2B, each global switch (e.g., 40-2a and 40-2b) may be connected via two links to each of the edge switches 20 per each HyperX network plane, and thus, for each network plane, the global switch spends two ports out of the M ports of the global switch for connection with the edge switches. In this case, the upper limit number of HyperX network planes interconnected through the global switch may be M/2.

In an exemplary embodiment, when each edge switch 20 has N ports and the optimal allocation of the edge switch port 20 is such that N/4 ports for connection with end nodes 30, N/4 ports for X-dimension all-to-all connection, N/4 ports for Y dimension all-to-all connection, and N/4 ports for connection with global switches in Z dimension (e.g., N≥36). In this case, if there are two links from each edge switch to each global switch, the maximum system size may be $(N/4)^3 * M/2$ (here, the symbol '*' denotes multiplication). For example, when N is 36 and M is equal to N, the network system 1 according to an exemplary embodiment of the present invention can be scaled up to 13,122 end nodes 30, which is half that of the case illustrated in FIGS. 1A and 1B. Accordingly, in an exemplary embodiment, the number of HyperX network planes interconnected through the global switches may inversely be proportional to the number of edge switches to which the global switch is connected per each network plane.

Figure 3:
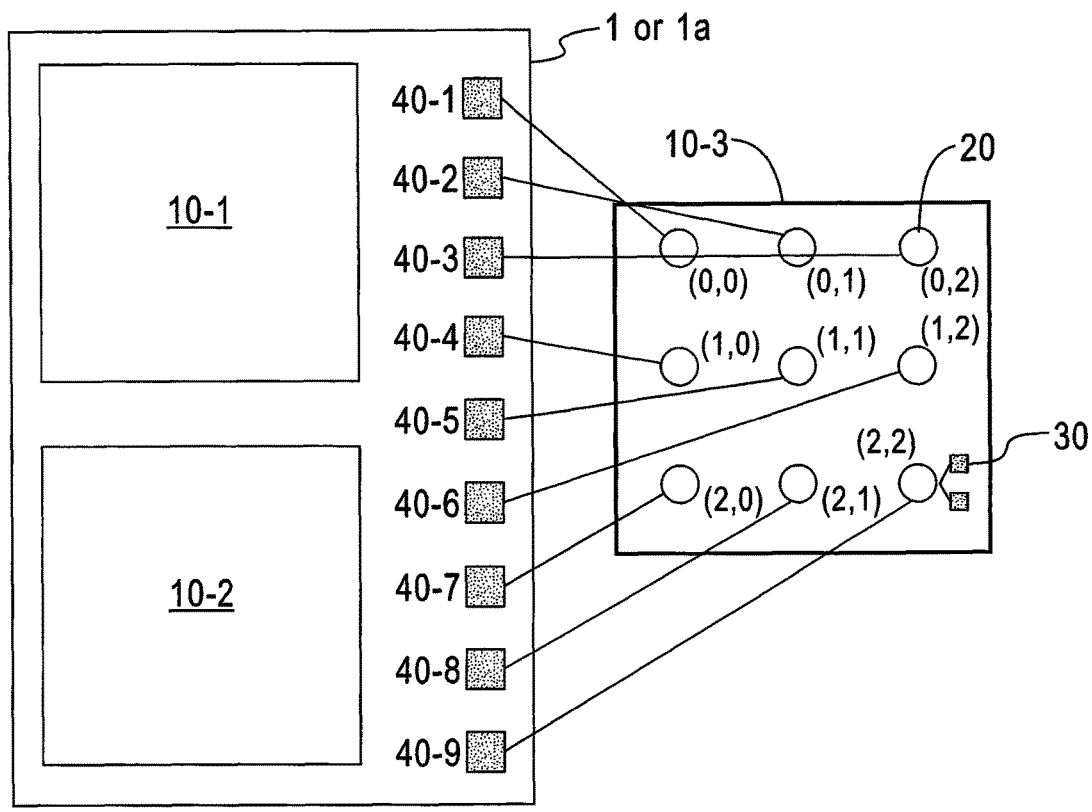
FIG. 3 is a diagram illustrating an example of adding a new HyperX network plane to the existing network system of FIG. 1B or 2B according to an exemplary embodiment of the present invention.

FIG. 3 is a diagram illustrating an example of adding a new HyperX network plane to the existing network system of FIG. 1B or 2B according to an exemplary embodiment of the present invention.

Referring to FIG. 3, a new HyperX network 10-3 to be added to the existing network system 1 or 1a has substantially the same network topology as each of the HyperX network planes 10-1 and 10-2. When the HyperX network 10-3 is added to the existing network system 1 or 1a, each of edge switches 20, which respectively correspond to coordinates (0,0), (0,1), (0,2), (1,0), (1,1), (1,2), (2,0), (2,1), and (2,2) as shown in FIG. 3, is connected to a corresponding one of the global switches 40-1 to 40-9, which have been used to interconnect the HyperX network planes 10-1 and 10-2. As described before, such addition of the HyperX network 10-3 does not affect the wirings of the existing network system 1 or 1a.

Referring to FIG. 3, the edge switch 20 at corresponding (0,0) coordinates in the HyperX network plane 10-3 is connected to the global switch 40-1 and thus, connected to the edge switches 20 at (0,0) coordinates in the HyperX network planes 10-1 and 10-2. Here, the edge switch 20 at (0,0) coordinates in the HyperX network plane 10-3 is connected to corresponding end nodes 30 (not shown). The edge switch 20 at corresponding (0,1) coordinates in the HyperX network plane 10-3 is connected to the global switch 40-2 and thus, connected to the edge switches 20 at (0,1) coordinates in the HyperX network planes 10-1 and 10-2. Here, the edge switch 20 at (0,1) coordinates in the HyperX network plane 10-3 is connected to corresponding end nodes 30 (not shown). The edge switch 20 at corresponding (0,2) coordinates in the HyperX network plane 10-3 is connected to the global switch 40-3 and thus, connected to the edge switches 20 at (0,2) coordinates in the HyperX network planes 10-1 and 10-2. Here, the edge switch 20 at (0,2) coordinates in the HyperX network plane 10-3 is connected to corresponding end nodes 30 (not shown). The edge switch 20 at corresponding (1,0) coordinates in the HyperX network plane 10-3 is connected to the global switch 40-4 and thus, connected to the edge switches 20 at (1,0) coordinates in the HyperX network planes 10-1 and 10-2. Here, the edge switch 20 at (1,0) coordinates in the HyperX network plane 10-3 is connected to corresponding end nodes 30 (not shown). The edge switch 20 at corresponding (1,1) coordinates in the HyperX network plane 10-3 is connected to the global switch 40-5 and thus, connected to the edge switches 20 at (1,1) coordinates in the HyperX network planes 10-1 and 10-2. Here, the edge switch 20 at (1,1) coordinates in the HyperX network plane 10-3 is connected to corresponding end nodes 30 (not shown). The edge switch 20 at corresponding (1,2) coordinates in the HyperX network plane 10-3 is connected to the global switch 40-6 and thus, connected to the edge switches 20 at (1,2) coordinates in the HyperX network planes 10-1 and 10-2. Here, the edge switch 20 at (1,2) coordinates in the HyperX network plane 10-3 is connected to corresponding end nodes 30 (not shown). The edge switch 20 at corresponding (2,0) coordinates in the HyperX network plane 10-3 is connected to the global switch 40-7 and thus, connected to the edge switches 20 at (2,0) coordinates in the HyperX network planes 10-1 and 10-2. Here, the edge switch 20 at (2,0) coordinates in the HyperX network plane 10-3 is connected to corresponding end nodes 30 (not shown). The edge switch 20 at corresponding (2,1) coordinates in the HyperX network plane 10-3 is connected to the global switch 40-8 and thus, connected to the edge switches 20 at (2,1) coordinates in the HyperX network planes 10-1 and 10-2. Here, the edge switch 20 at (2,1) coordinates in the HyperX network plane 10-3 is connected to corresponding end nodes 30 (not shown). The edge switch 20 at corresponding (2,2) coordinates in the HyperX network plane 10-3 is connected to the global switch 40-9 and thus, connected to the edge switches 20 at (2,2) coordinates in the HyperX network planes 10-1 and 10-2. Here, the edge switch 20 at (2,2) coordinates in the HyperX network plane 10-3 is connected to corresponding end nodes 30.

Another HyperX network plane can be added to the network system 1 or 1a as substantially the same manner in which the HyperX network plane 10-3 is added, provided there is at least one unused port on each global switch.

Figure 4A:
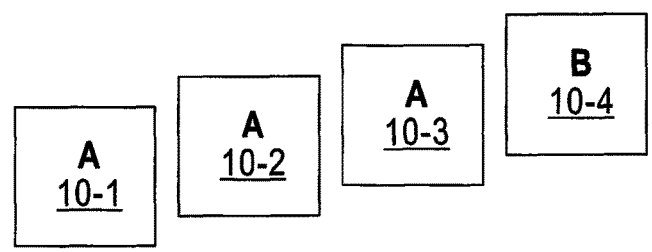
FIG. 4A is a diagram illustrating an example of partitioning a network system including interconnected HyperX network planes according to an exemplary embodiment of the present invention.

The network system 1 or 1a according to an exemplary embodiment of the present invention can be divided into multiple partitions along the Z dimension for different jobs. Each of the partitions includes one or more planes and acts in an independent manner when the whole network system needs to be divided for multiple user tasks. Network traffic within each plane, or a group of planes, does not interfere with any other plane because the planes are decoupled by the global switches. Exploiting this property, various combinations of partition sizes are possible. For example, if there are 4 planes, possible partitioning examples include 2 partitions with 3 planes and 1 plane (as illustrated in FIG. 4A) or 2 planes and 2 planes. However, the number of partitions and combinations of dividing partitions are not limited thereto.

Figure 4B:
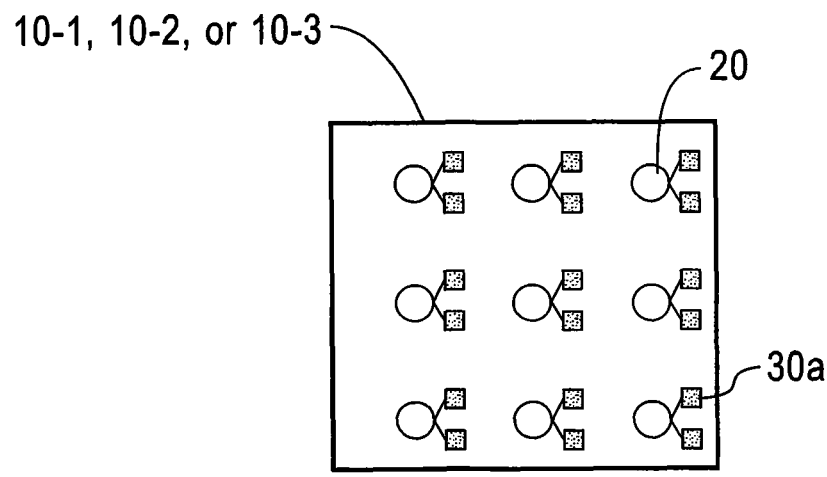
FIG. 4B is a diagram illustrating end nodes connected to each edge switch in a HyperX network plane partitioned with type A according to an exemplary embodiment of the present invention.
Figure 4C:
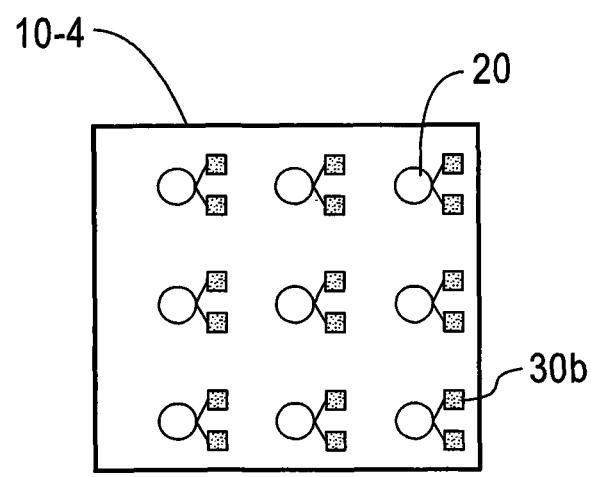
FIG. 4C is a diagram illustrating end nodes connected to each edge switch in a HyperX network plane partitioned with type B according to an exemplary embodiment of the present invention.
Figure 4D:
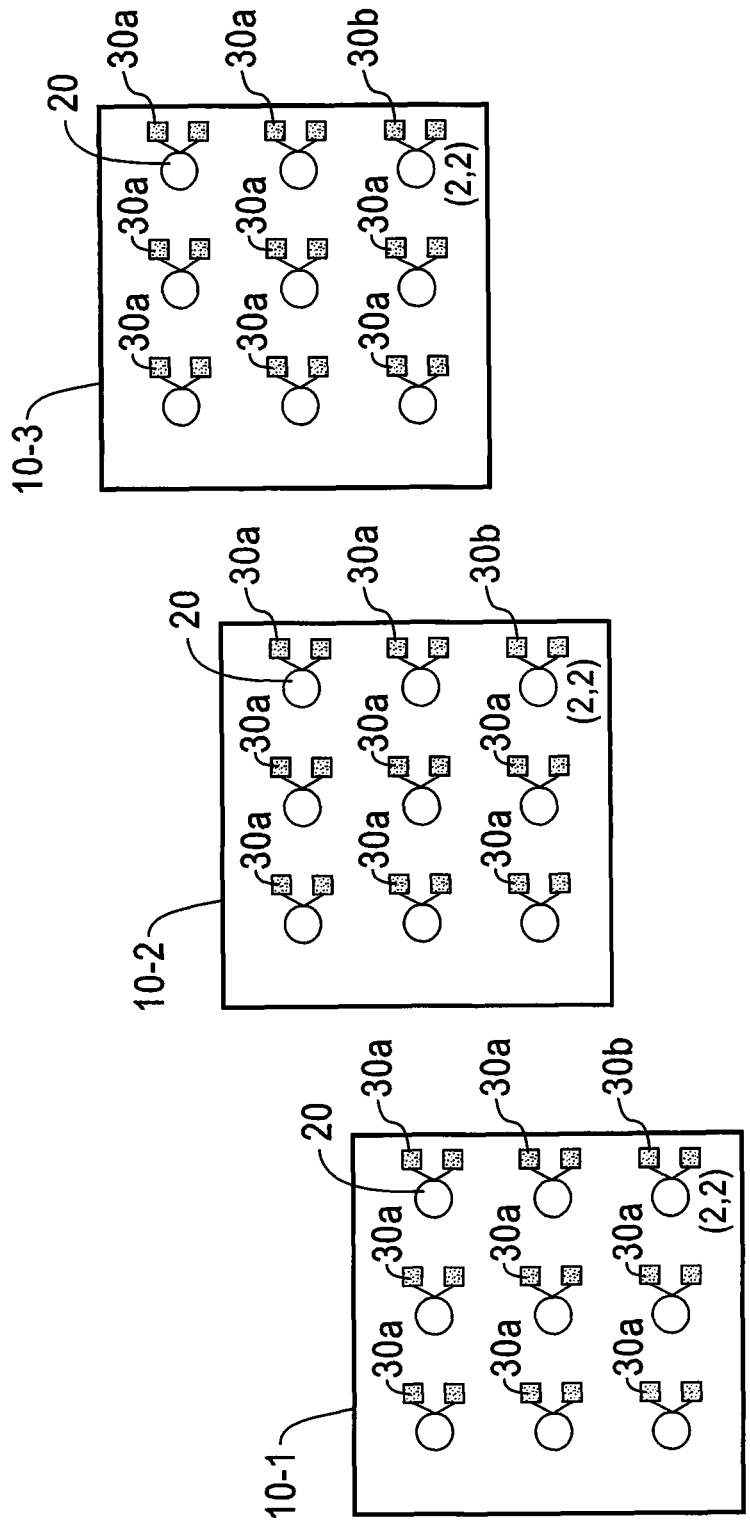
FIG. 4D is a diagram illustrating an example of partitioning a network system including interconnected HyperX network planes according to an exemplary embodiment of the present invention.

FIG. 4A is a diagram illustrating an example of partitioning a network system including interconnected HyperX network planes according to an exemplary embodiment of the present invention. FIG. 4B is a diagram illustrating end nodes connected to each edge switch in a HyperX network plane partitioned with type A according to an exemplary embodiment of the present invention. FIG. 4C is a diagram illustrating end nodes connected to each edge switch in a HyperX network plane partitioned with type B according to an exemplary embodiment of the present invention. FIG. 4D is a diagram illustrating a method of partitioning a network system including interconnected HyperX network planes according to an exemplary embodiment of the present invention.

In an exemplary embodiment, referring to FIG. 4A, a partition A including the planes 10-1 to 10-3 runs to communicate compute nodes 30a as end nodes (see FIG. 4B), and a partition B including a plane 10-4 runs to communicate I/O nodes 30b as the end nodes (see FIG. 4C). Since the compute nodes 30a and the I/O nodes 30b are different in functionality in a network system, connecting them in different planes decoupled by the global switches may allow to relatively high separation between partitions.

In an exemplary embodiment, referring to FIG. 4D, one partition includes edges switches 20 and I/O nodes 30b, which correspond to a certain location (e.g., (2,2) coordinates) in the HyperX network planes 10-1 to 10-3 and another partition includes switches 20 and compute nodes 30a, which correspond to another locations (e.g., (0,0), (0,1), (0,2), (1,0), (1,1), (1,2), (2,0), and/or (2,1) other than the (2,2) coordinates). In FIGS. 4A to 4D, the links among the edge switches 20 in each plane, the links via the global switches (e.g., 40-1 to 40-9) among the edge switches 20 between the planes 10-1 to 10-3 are omitted for simplicity sake.

Deadlock free direct and indirect routing methods are available on a network system built by interconnecting HyperX network planes.

Figure 5A:
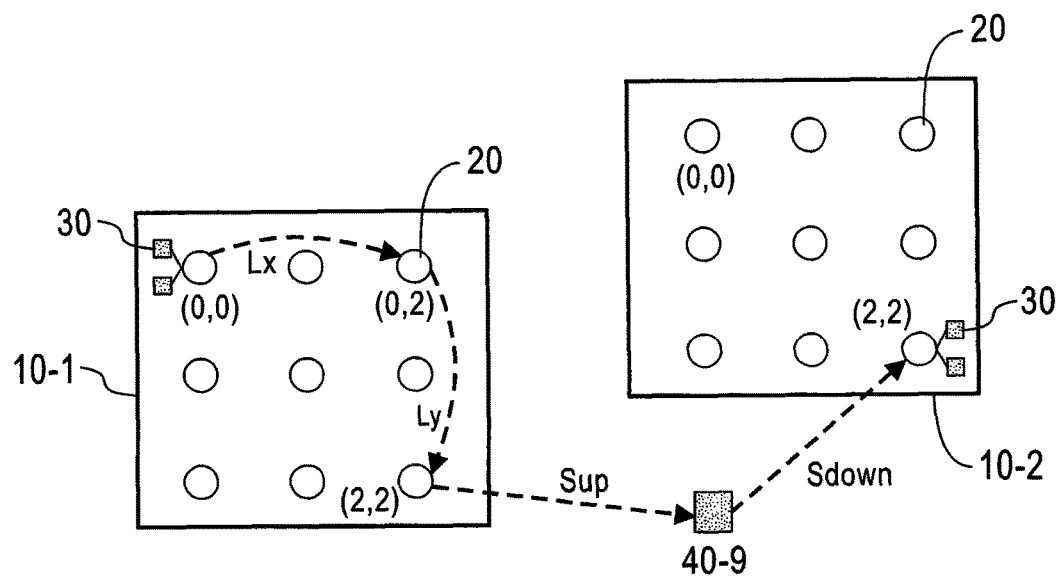
FIGS. 5A and 5B are diagrams illustrating examples of direct routing paths for sending a message from a source end node to a destination end node according to an exemplary embodiment of the present invention.
Figure 5B:
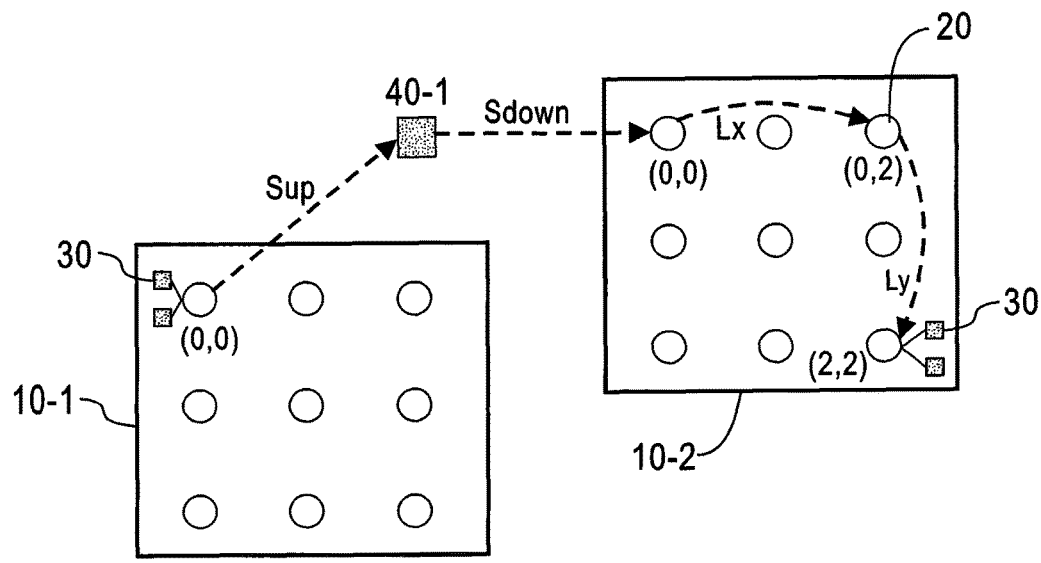

FIGS. 5A and 5B are diagrams illustrating examples of direct routing paths for sending a message from a source end node to a destination end node according to an exemplary embodiment of the present invention.

Referring to FIGS. 5A and 5B, direct routing paths having 4 hop links are accomplished between the HyperX network planes 10-1 and 10-2. In this case, hop links between end nodes 30 and edge switches 20 are not counted for the 4 hop links for simplicity sake.

It is assumed that the HyperX network planes 10-1 and 10-2 are source and destination planes, respectively, and an edge switch 20 of (0,0) coordinates in the source plane 10-1 and an edge switch 20 of (2,2) coordinates in the destination plane 10-2 are source and destination edge switches 20, respectively, FIG. 5A illustrates a direct routing path according to an exemplary embodiment of the present invention including 4 hop links: Lx-Ly-Sup-Sdown. However, exemplary embodiments of the present invention are not limited thereto, and the 4 hop links may include Ly-Lx-Sup-Sdown. In this case, the message MSG first hops (e.g., Lx-Ly) over the source plane 10-1, and then hops (e.g., Sup-Sdown) through a global switch from the source plane 10-1 to the destination plane 10-2.

Referring to FIGS. 5A and 5B, the source edge switch 20 of (0,0) coordinates is connected to an source end node 30 which generates the message MSG, and the destination edge switch 20 of (2,2) coordinates in the destination plane 10-2 is connected to a destination end node 30 which receives or process the message MSG. As shown in FIG. 5A, the message MSG may travel over a first hop link (e.g., Lx) from the source edge switch 20 of (0,0) coordinates to an edge switch 20 of (0,2) coordinates in the source plane 10-1. Further, the message MSG may travel over a second hop link (e.g., Ly) from the edge switch 20 of (0,2) coordinates to an edge switch 20 of (2,2) coordinates in the source plane 10-1. Still further, the message MSG may travel over a third hop link (e.g., Sup) from the edge switch 20 of (2,2) coordinates to the global switch 40-9 and a fourth hop link (e.g., Sdown) from the global switch 40-9 to the destination edge switch 20 of (2,2) coordinates in the destination plane 10-2.

FIG. 5B illustrates a direct routing path according to an exemplary embodiment of the present invention including 4 hop links: Sup-Sdown-Lx-Ly. However, exemplary embodiments of the present invention are not limited thereto, and the 4 hop links may include Sup-Sdown-Ly-Lx. In this case, the message MSG first hops (e.g., Sup-Sdown) through a global switch from the source plane 10-1 to the destination plane 10-2, and then hops (e.g., Lx-Ly) over the destination plane 10-2.

Referring to FIG. 5B, the message MSG may travel over a first hop link (e.g., Sup) from the source edge switch 20 of (0,0) coordinates to the global switch 40-1 and a second hop link (e.g., Sdown) from the global switch 40-1 to an edge switch 20 of (0,0) coordinates in the destination plane 10-2. Further, the message MSG may travel over a third hop link (e.g., Lx) from the edge switch 20 of (0,0) coordinates to an edge switch 20 of (0,2) coordinates and a fourth hop link (e.g., Ly) from the edge switch 20 of (0,2) coordinates to the destination edge switch 20 of (2,2) coordinates in the destination plane 10-2.

In addition, according to an exemplary embodiment of the present invention, various indirect routing paths may be possible as alternatives of the direct routing paths.

FIGS. 6A to 6F are diagrams illustrating examples of indirect routing paths for sending a message from a source end node to a destination end node according to an exemplary embodiment of the present invention.

Similarly to the exemplary embodiments described with reference to FIGS. 5A and 5B, hop links between each end node 30 and each edge switch 20 are not counted for the indirect routing hop links for simplicity sake, and the edge switch 20 of (0,0) coordinates in the source plane 10-1 and the edge switch 20 of (2,2) coordinates in the destination plane 10-2 are source and destination edge switches 20, respectively.

Referring to FIGS. 6A to 6F, the source edge switch 20 of (0,0) coordinates is connected to an source end node 30 which generates the message MSG, and the destination edge switch 20 of (2,2) coordinates in the destination plane 10-2 is connected to a destination end node 30 which receives or process the message MSG.

Figure 6A:
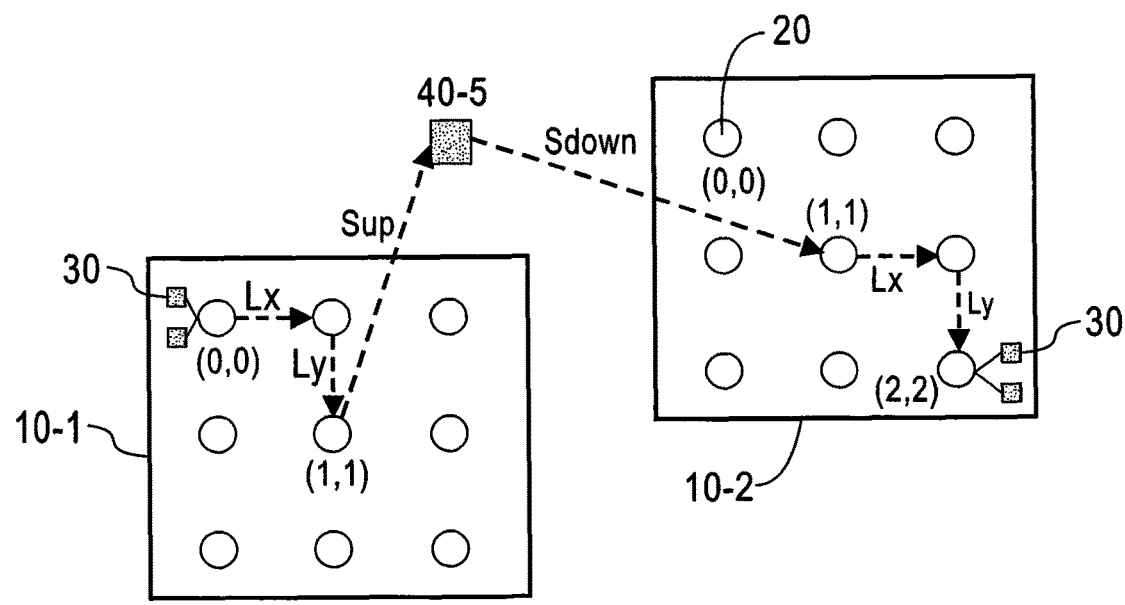
FIGS. 6A to 6F are diagrams illustrating examples of indirect routing paths for sending a message from a source end node to a destination end node according to an exemplary embodiment of the present invention.
Figure 6B:
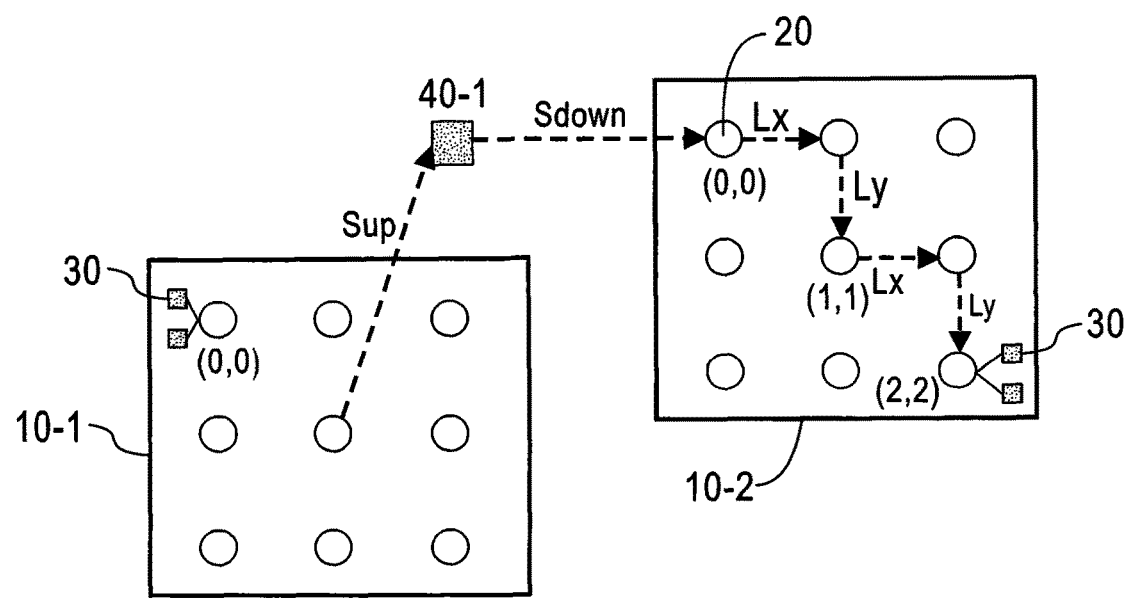

Referring to FIGS. 6A and 6B, indirect routing paths having 6 hop links are accomplished via an intermediate edge switch 20.

FIG. 6A illustrates an indirect routing path according to an exemplary embodiment of the present invention including 6 hop links: Lx-Ly-Sup-Sdown-Lx-Ly. However, exemplary embodiments of the present invention are not limited thereto, and the 6 hop links may include Ly-Lx-Sup-Sdown-Lx-Ly, Lx-Ly-Sup-Sdown-Ly-Lx, or Ly-Lx-Sup-Sdown-Ly-Lx.

FIG. 6A illustrates an example in which the intermediate edge switch (e.g., at (1,1) coordinates) is located in the source plane 10-1, so that, in this case, a message MSG first hops (e.g., Lx-Ly) over the source plane 10-1, hops (e.g., Sup-Sdown) through a global switch from the source plane 10-1 to the destination plane 10-2, and then hops (e.g., Lx-Ly) over the destination plane 10-2.

In an exemplary embodiment, the message MSG travels over a first hop link (e.g., Lx) from the source edge switch 20 of (0,0) coordinates to an edge switch 20 of (0,1) coordinates and a second hop link (e.g., Ly) from the edge switch 20 of (0,1) coordinates to the intermediate edge switch 20 of (1,1) coordinates in the source plane 10-1. Further, the message MSG travels over a third hop link (e.g., Sup) from the intermediate edge switch 20 to the global switch 40-5 and a fourth hop link (e.g., Sdown) from the global switch 40-5 to an edge switch 20 of (1,1) coordinates in the destination plane 10-2. Still further, the message MSG travels over a fifth hop link (e.g., Lx) from the edge switch 20 of (1,1) coordinates to an edge switch 20 of (1,2) coordinates and a sixth hop link (e.g., Ly) from the edge switch 20 of (1,2) coordinates to the destination edge switch 20 of (2,2) coordinates in the destination plane 10-2.

FIG. 6B illustrates an indirect routing path according to an exemplary embodiment of the present invention including 6 hop links: Sup-Sdown-Lx-Ly-Lx-Ly. However, exemplary embodiments of the present invention are not limited thereto, and the 6 hop links may include Sup-Sdown-Ly-Lx-Lx-Ly, Sup-Sdown-Lx-Ly-Ly-Lx, or Sup-Sdown-Ly-Lx-Ly-Lx.

FIG. 6B illustrates an example in which the intermediate edge switch is located in destination plane 10-2, so that, in this case, the message MSG first hops (e.g., Sup-Sdown through a global switch from the source plane 10-1 to the destination plane 10-2, and then hops (e.g., Lx-Ly-Lx-Ly) over the destination plane 10-2.

In an exemplary embodiment, the message MSG travels over a first hop link (e.g., Sup) from the source edge switch 20 of (0,0) coordinates in the source plane 10-1 to the global switch 40-1 and a second hop link (e.g., Sdown) from the global switch 40-1 to an edge switch 20 of (0,0) coordinates in the destination plane 10-2. Further, the message MSG hops over a third hop link (e.g., Lx) from the edge switch 20 of (0,0) coordinates to an edge switch 20 of (0,1) and a fourth hop link (e.g., Ly) from the edge switch 20 of (0,1)

coordinates to an intermediate edge switch 20 of (1,1) coordinates in the destination plane 10-2. Still further, the message MSG travels over a fifth hop link (e.g., Lx) from the intermediate edge switch 20 to an edge switch 20 of (1,2) coordinates and a sixth hop link (e.g., Ly) from the edge switch 20 of (1,2) coordinates to the destination edge switch 20 of (2,2) coordinates in the destination plane 10-2.

Figure 6C:
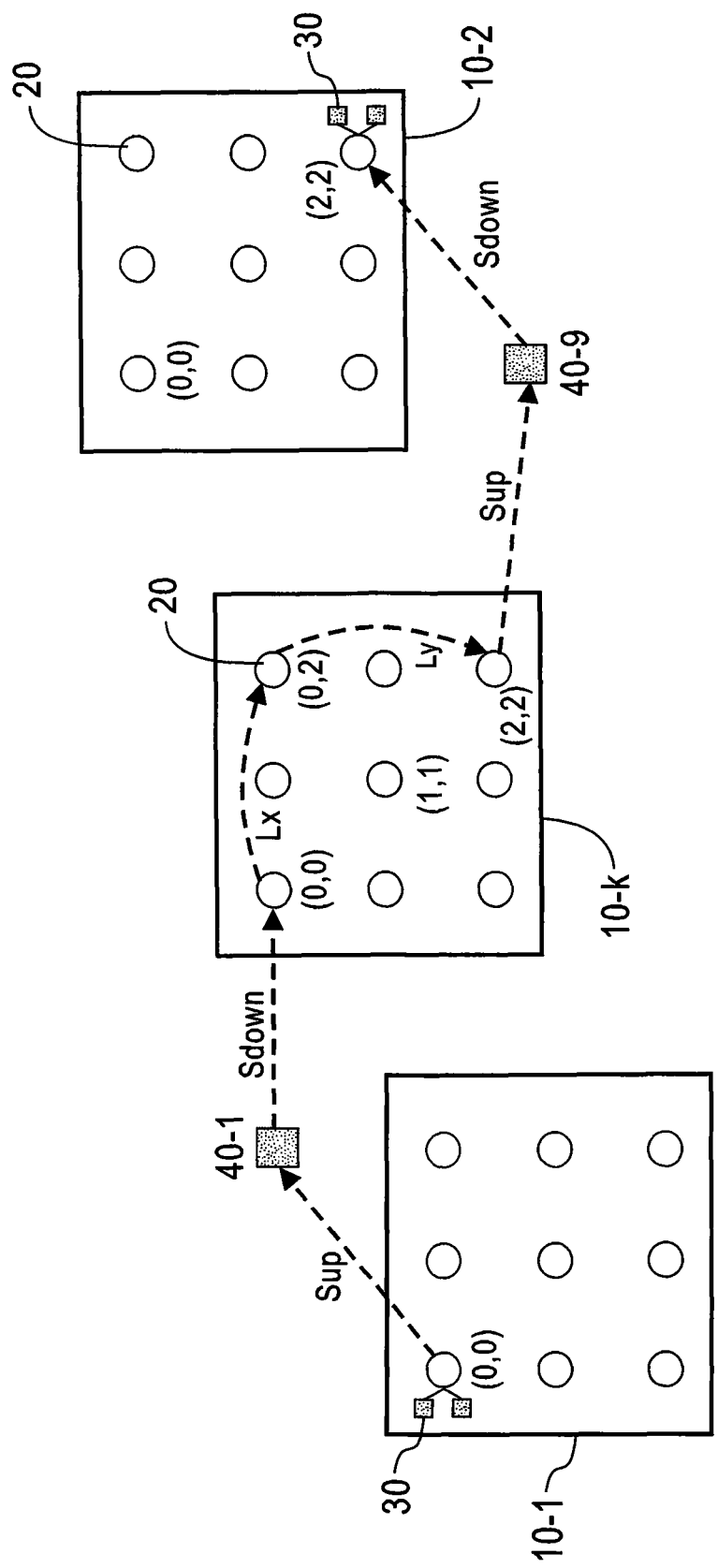
Figure 6D:
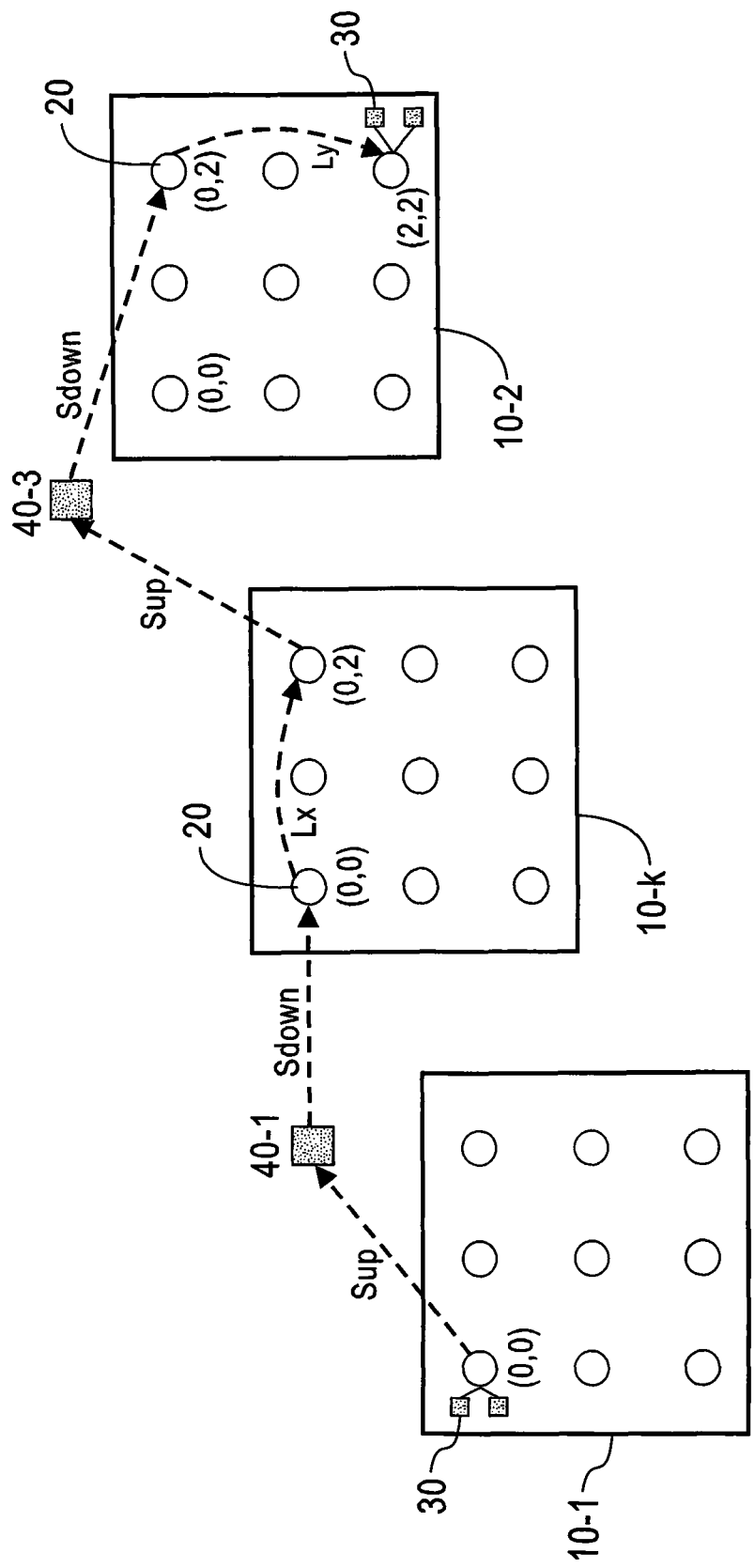
Figure 6E:
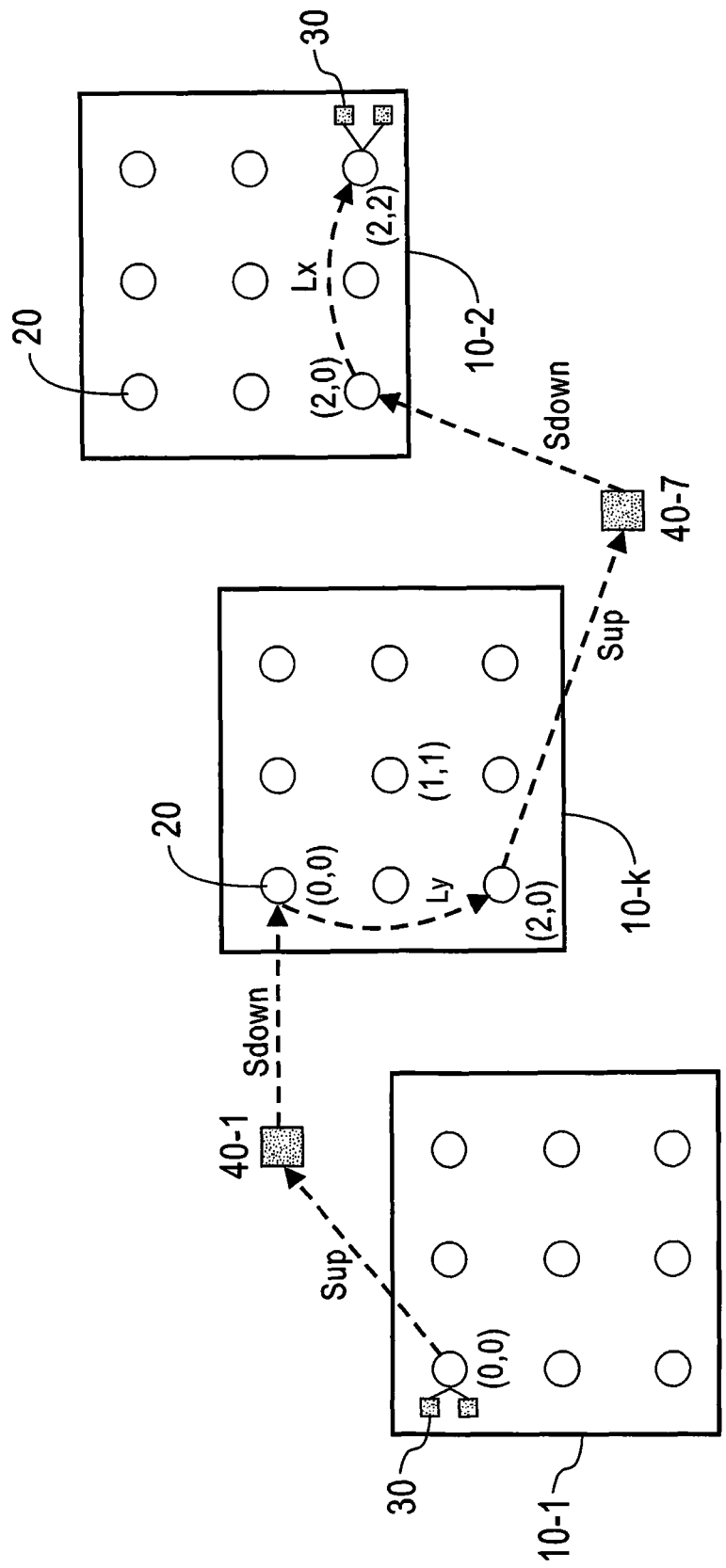

FIGS. 6C-6E illustrate indirect routing paths using an intermediate plane according to an exemplary embodiment of the present invention. In exemplary embodiments described with reference with FIGS. 6C-6E, the message MSG first hops (e.g., Sup-Sdown) through a global switch from the source plane 10-1 to an intermediate plane 10-k (here, k is a positive integer other than 1 and 2), hops over the intermediate plane 10-k, and then hops through another global switch to the destination plane 10-2.

The indirect routing path illustrated in FIG. 6C includes 6 hop links: Sup-Sdown-Lx-Ly-Sup-Sdown. However, exemplary embodiments of the present invention are not limited thereto, and the 6 hop links may include Sup-Sdown-Ly-Lx-Sup-Sown.

In an exemplary embodiment, the message MSG travels over a first hop link (e.g., Sup) from the source edge switch 20 of (0,0) coordinates in the source plane 10-1 to the global switch 40-1 and a second hop link Sdown from the global switch 40-1 to an edge switch 20 of (0,0) coordinates in the intermediate plane 10-k. Further, the message MSG travels with 2 hops over a third hop link (e.g., Lx) from the edge switch 20 of (0,0) coordinates to an edge switch 20 of (0,2) and a fourth hop link (e.g., Ly) from the edge switch 20 of (0,2) coordinates to an edge switch 20 of (2,2) coordinates in the intermediate plane 10-k. Still further, the message MSG travels over a fifth hop link (e.g., Sup) from the edge switch 20 of (2,2) coordinates in the intermediate plane 10-k to the global switch 40-9 and a sixth hop link (e.g., Sdown) from the global switch 40-9 to the destination edge switch 20 of (2,2) coordinates in the destination plane 10-2.

The indirect routing path illustrated in FIG. 6D includes 6 hop links: Sup-Sdown-Lx-Sup-Sdown-Ly.

In an exemplary embodiment, the message MSG travels over a first hop link (e.g., Sup) from the source edge switch 20 of (0,0) coordinates in the source plane 10-1 to the global switch 40-1 and a second hop link (e.g., Sdown) from the global switch 40-1 to an edge switch 20 of (0,0) coordinates in the intermediate plane 10-k. Further, the message MSG travels with a single hop over a third hop link (e.g., Lx) from the edge switch 20 of (0,0) coordinates to an edge switch 20 of (0,2) in the intermediate plane 10-k. Still further, the message MSG travels over a fourth hop link (e.g., Sup) from the edge switch 20 of (0,2) coordinates in the intermediate plane 10-k to the global switch 40-3 and a fifth hop link (e.g., Sdown) from the global switch 40-3 to an edge switch 20 of (0,2) coordinates in the destination plane 10-2. Still further, the message MSG travels over a sixth hop link (e.g., Ly) from the edge switch 20 of (0,2) coordinates to the destination edge switch 20 of (2,2) coordinates in the destination plane 10-2.

The indirect routing path illustrated in FIG. 6E includes 6 hop links: Sup-Sdown-Ly-Sup-Sdown-Lx.

In an exemplary embodiment, the message MSG trawls over a first hop link (e.g., Sup) from the source edge switch 20 of (0,0) coordinates in the source plane 10-1 to the global switch 40-1 and a second hop link (e.g., Sdown) from the global switch 40-1 to the edge switch 20 of (0,0) coordinates in the intermediate plane 10-k. Further, the message MSG travels with a single hop over a third hop link (e.g., Ly) from the edge switch 20 of (0,0) coordinates to an edge switch 20 of (2,0) in the intermediate plane 10-k. Still further, the message MSG travels over a fourth hop link (e.g., Sup) from the edge switch 20 of (2,0) coordinates in the intermediate plane 10-k to a global switch 40-7 and a fifth hop link (e.g., Sdown) from the global switch 40-7 to an edge switch 20 of (2,0) coordinates in the destination plane 10-2. Still further, the message MSG travels over a sixth hop link (e.g., Lx) from the edge switch 20 of (2,0) coordinates to the destination edge switch 20 of (2,2) coordinates in the destination plane 10-2.

Figure 6F:
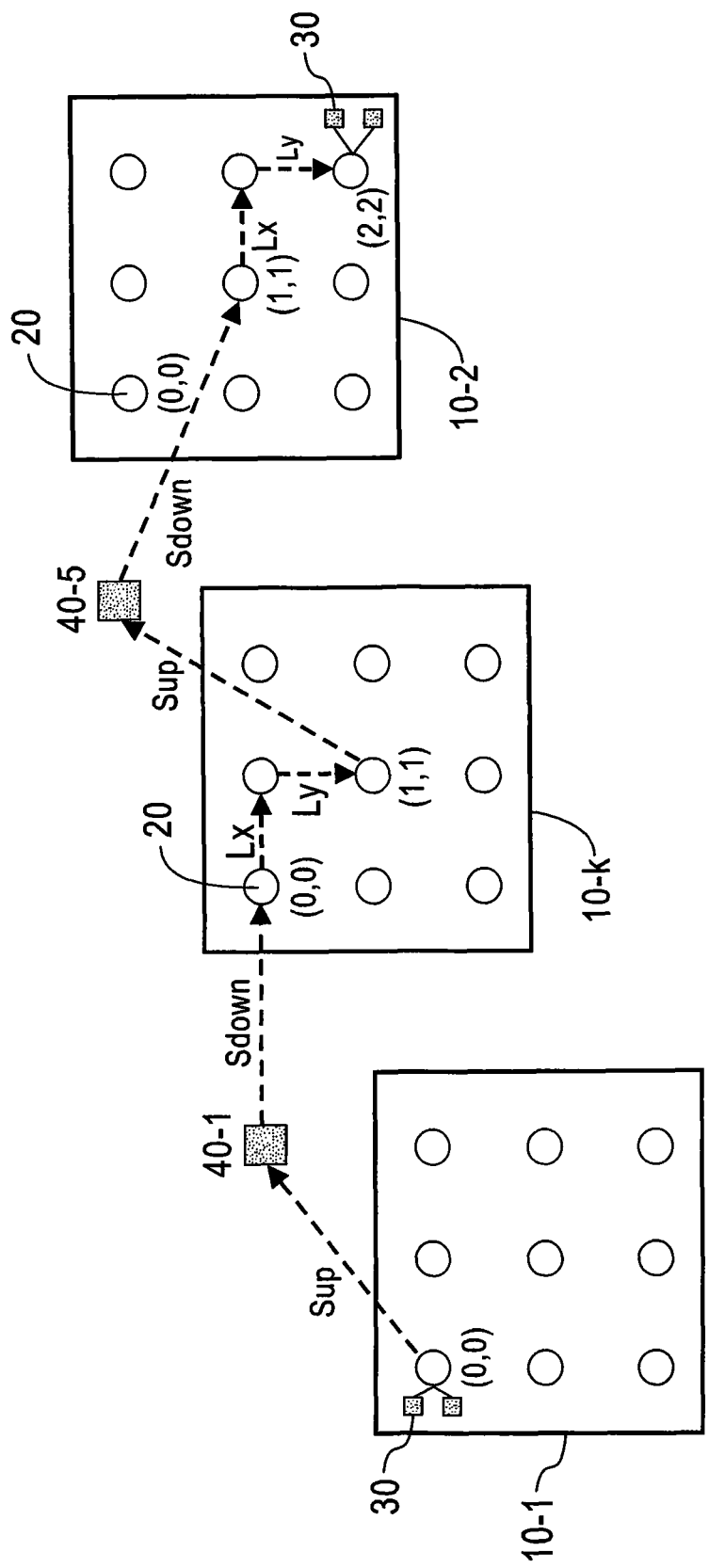

FIG. 6F illustrates a further indirect routing path using an intermediate edge switch and an intermediate plane according to an exemplary embodiment of the present invention. Referring to FIG. 6F, a message MSG first hops (e.g., Sup-Sdown) through a global switch from the source plane 10-1 to the intermediate plane 10-k, hops (e.g., Lx-Ly) over the intermediate plane 10-k, and then hops through another global switch to the destination plane 10-2. Afterward, the message MSG hops (e.g., Lx-Ly) over the destination plane 10-2.

The indirect routing path illustrated in FIG. 6F includes 8 hop links: Sup-Sdown-Lx-Ly-Sup-Sdown-Lx-Ly. However, exemplary embodiments of the present invention are not limited thereto, and the 8 hop links may include Sup-Sdown-Lx-Ly-Sup-Sdown-Ly-Lx, Sup-Sdown-Ly-Lx-Sup-Sdown-Lx-Ly, or Sup-Sdown-Ly-Lx-Sup-Sdown-Ly-Lx.

In an exemplary embodiment, the message MSG travels over a first hop link (e.g., Sup) from the source edge switch 20 of (0,0) coordinates in the source plane 10-1 to the global switch 40-1 and a second hop link (e.g., Sdown) from the global switch 40-1 to an edge switch 20 of (0,0) coordinates in the intermediate plane 10-k. Further, the message MSG travels with 2 hops over a third hop link (e.g., Lx) from the edge switch 20 of (0,0) coordinates to an edge switch 20 of (0,1) and a fourth hop link (e.g., Ly) from the edge switch 20 of (0,1) coordinates to an intermediate edge switch 20 of (1,1) coordinates in the intermediate plane 10-k. Still further, the message MSG travels over a fifth hop link (e.g., Sup) from the intermediate edge switch 20 in the intermediate plane 10-k to the global switch 40-5 and a sixth hop link (e.g., Sdown) from the global switch 40-5 to an edge switch 20 of (1,1) coordinates in the destination plane 10-2. Still further, the message MSG travels with 2 hops over a seventh hop link (e.g., Lx) from the edge switch 20 of (1,1) coordinates to an edge switch 20 of (1,2) and an eighth hop link (e.g., Ly) from the edge switch 20 of (1,2) coordinates to the destination edge switch 20 of (2,2) coordinates in the destination plane 10-2.

Exemplary indirect routing paths illustrated in FIGS. 6C to 6E are provided based on a predetermined order in directions of, e.g., X, Y, and Z, and in this case, 2 virtual channels (VCs) per link may be required for deadlock free operation. Here, each virtual channel represents a separate buffer for message packets in the switches. As the number of hops in a routing path is increased, network latency may be increased and all-to-all bandwidth may be decreased. For example, in case when each indirect path have more hops by, e.g., two, than the direct path for each routing, as described with reference to FIGS. 5A, 5B, and 6A-6E, all-to-all bandwidth with indirect routing may be about ¾ that of direct routing. Indirect routing is useful to avoid hotspots under certain adversarial traffic patterns, and can dramatically increase delivered end-to-end bandwidth over direct routing for such adversarial patterns.

Figure 7:
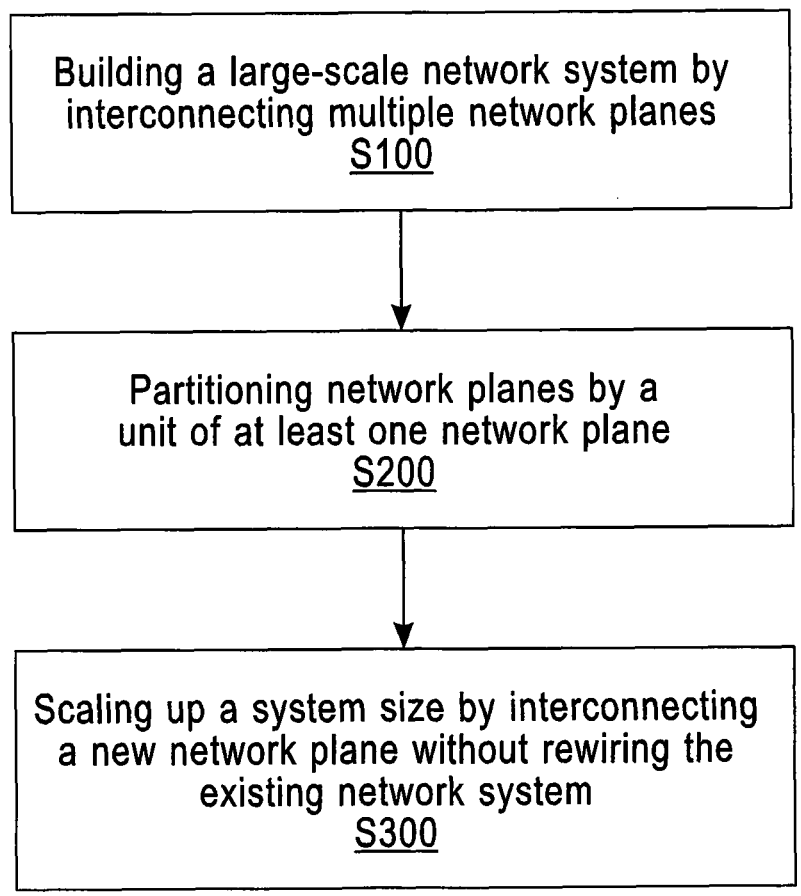
FIG. 7 is a flowchart illustrating a method for building a network system by interconnecting multiple HyperX network planes according to an exemplary embodiment of the present invention.

FIG. 7 is a flowchart illustrating a method for building a network system by interconnecting multiple HyperX network planes according to an exemplary embodiment of the present invention.

Each of the HyperX network planes includes P×Q grid of edge switches. Links between the edge switches 20 in each column direction of the P×Q grid are interconnected in an all-to-all manner. Links between the edge switches 20 in each row direction of the P×Q grid are interconnected in an all-to-all manner.

The method includes step S100 building the multiple HyperX network planes 10-1 and 10-2 by connecting a group of first edge switches 20 at a same location in the HyperX network planes 10-1 and 10-2 to at least one of global switches.

In an exemplary embodiment, the method may further include step S200 partitioning the HyperX network planes 10-1 and 10-2 by a unit of at least one HyperX network plane.

In an exemplary embodiment, the method may further include step S300 scaling up a size of the network system by interconnecting a new HyperX network plane (e.g., 10-3) having the same network topology as each of the HyperX network planes.

An edge switch 20, which has the same location in the new HyperX network plane 10-3 as the first edge switch in the existing HyperX network planes 10-1 and 10-2 may be connected to the at least one of the global switches 40-1 to 40-9.

When each of the global switches 40-1 to 40-9 may have N ports, the maximum number of the HyperX network planes in the network system may be M. In an exemplary embodiment, M may be equal to N or N/2.

Although the method according the exemplary embodiment with reference to FIG. 7 is described to include the steps, S100, S200, and S300, the present invention is not limited thereto. For example, the method according to an exemplary embodiment of the present invention may include the steps S100 and S200 or the steps S100 and S300. In addition, although the step S200 is illustrated as if being performed between the steps S100 and S300 in FIG. 7, the present invention is not limited thereto. For example, the step S200 may be performed while the step S100 is performed or after the step S300 is performed.

Figure 8:
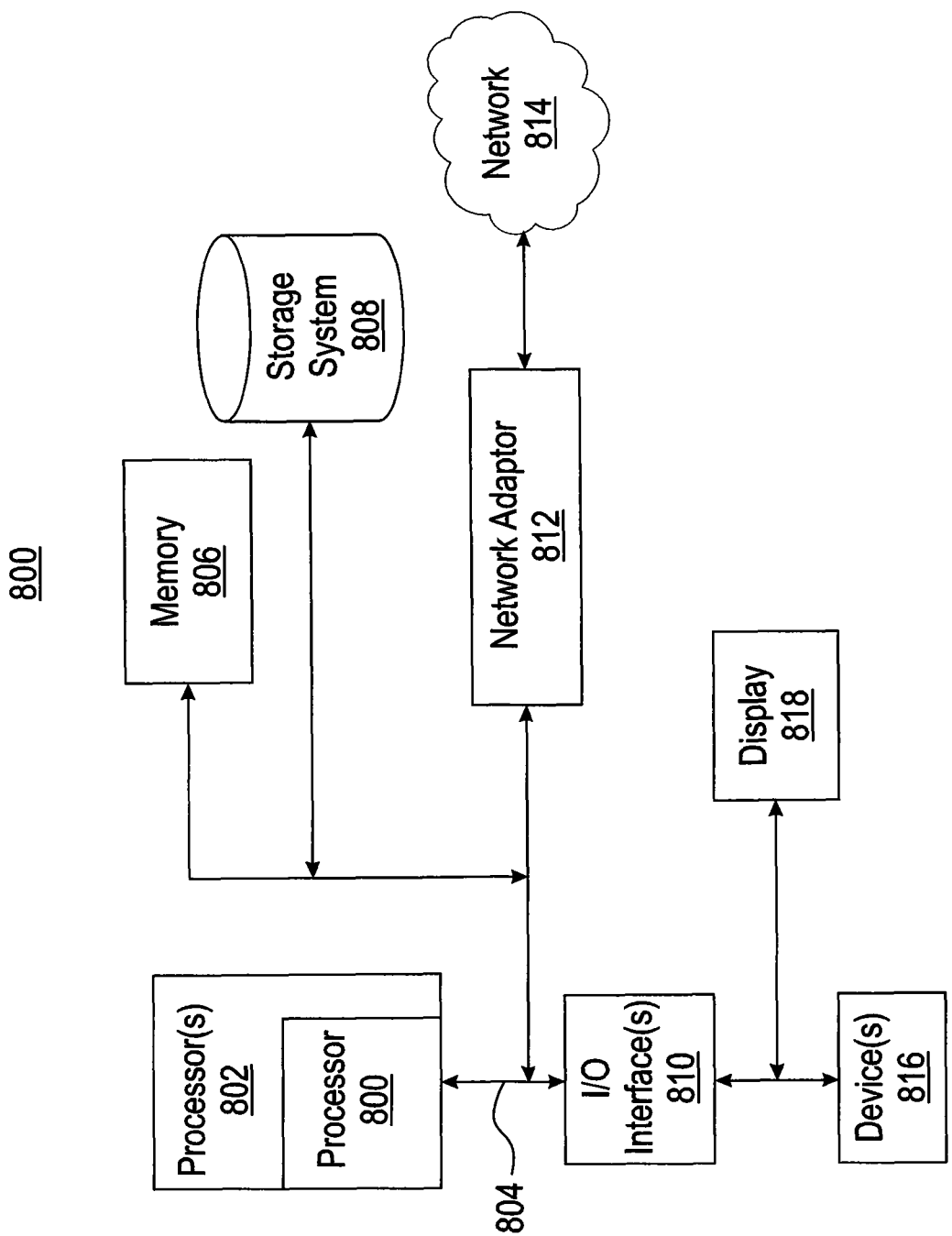
FIG. 8 illustrates a schematic diagram of an example computer or processing system that implements the extending the scalability and improving the partitionability of baseline networks for transporting a message (e.g., packet) from a source end node to a destination end node according to an exemplary embodiment of the present invention.

FIG. 8 illustrates a schematic diagram of an example computer system 800 that implements the extending the scalability and improving the partitionability of baseline networks for transporting a message (e.g., packet) from a source end node to a destination end node according to an exemplary embodiment of the present invention.

The computer system 800 is only one example of a suitable processing system and is not intended to suggest any limitation as to the scope of use or functionality of embodiments of the methodology described herein. The processing system may be operational with numerous other general purpose or special purpose computing system environments or configurations. Examples of well-known computing systems, environments, and/or configurations that may be suitable for use with the computer system 800 shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system 800 may be practiced in distributed cloud computing environments where tasks are performed by remote processing devices that are linked through a communications network. In a distributed cloud computing environment, program modules may be located in both local and remote computer system storage media including memory storage devices.

In an exemplary embodiment, the computer system 800 may function as a controller (e.g., control system or network management system) that is responsible for setting up the routes etc that manages or controls overall operations of scaling up a network system size by adding new network planes to existing baseline networks. For example, program modules executed by the computer system 800 may use connection information (e.g., mapping table) that includes connection relationships between each edge switch 20 of the new network plane and a corresponding global switch of the existing baseline network when the new network plane is added, e.g., as illustrated in FIG. 3. The connection information may be stored in the computer system 800. In an exemplary embodiment, the connection information may be stored in a memory outside the computer system 800, and thus, may be provided to the computer network in a wired or wireless manner.

In an exemplary embodiment, the computer system 800 may function as a controller (e.g., a control system or a network management system) that manages or controls overall operations of dividing the network system (e.g., 1 or 1a) in multiple partitions, e.g., as illustrated in FIGS. 4A-4C. Program modules executed by the computer system 800 may determine an optimum partition map of the network system based on a network traffic status and a system resource usage to maximize network bandwidth in the network system.

In an exemplary embodiment, the computer system 800 may function as a controller (e.g., a control system or a network management system) that manages or controls overall operations of routing a message (e.g., packet traffic) from a source end node to a destination end node over edges switches in the network system (e.g., 1 or 1a). For example, for each of routing scenarios (e.g., the direct and indirect routings), algorithms with respect to how the network resources (e.g., edge switches and global switches) may be connected and operated may programmed in program modules, and the program modules may be executed by the computer system 800.

The computer system 800 may include, but are not limited to, one or more processors or processing units 802, a system memory 806, and a bus 804 that couples various system components including system memory 806 to processor 802. The processor 802 may include a module 800 that performs the methods described herein. The module 800 may be programmed into the integrated circuits of the processor 802, or loaded from memory 806, storage device 808, or network 814 or combinations thereof.

Bus 804 may represent one or more of any of several types of bus structures, including a memory bus or memory controller, a peripheral bus, an accelerated graphics port, and a processor or local bus using any of a variety of bus architectures. By way of example, and not limitation, such architectures include industry standard architecture (ISA) bus, micro channel architecture (MCA) bus, enhanced ISA (EISA) bus, video electronics standards association (VESA) local bus, and peripheral component interconnects (PCI) bus.

The computer system 800 may include a variety of computer system readable media. Such media may be any available media that is accessible by the computer system 800, and it may include both volatile and non-volatile media, removable and non-removable media.

System memory 806 can include computer system readable media in the form of volatile memory, such as random access memory (RAM) and/or cache memory or others. The computer system 800 may further include other removable/non-removable, volatile/non-volatile computer system storage media. By way of example only, storage system 808 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 804 by one or more data media interfaces.

The computer system 800 may also communicate with one or more external devices 816 such as a keyboard, a pointing device, a display 818, etc.; one or more devices that enable a user to interact with the computer system 800; and/or any devices (e.g., network card, modem, etc.) that enable the computer system 800 to communicate with one or more other computing devices. Such communication can occur via Input/Output (I/O) interfaces 810.

Still yet, the computer system 800 can communicate with one or more networks 814 such as a local area network (LAN), a general wide area network (WAN), and/or a public network (e.g., the Internet) via network adapter 812. As depicted, network adapter 812 communicates with the other components of the computer system 800 via bus 804. It should be understood that although not shown, other hardware and/or software components could be used in conjunction with the computer system 800. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A network system, comprising:
a plurality of sub-network planes having a same network topology as each other, the sub-network planes comprising a first sub-network plane, a second sub-network plane, and a third sub-network plane, the sub-network planes interconnected through one or more global switches, each of the sub-network planes comprises edge switches, each of the edge switches having N ports; and
the one or more global switches including a first global switch, the first global switch configured to connect a first edge switch at a first location in the first sub-network plane and a second edge switch at a corresponding first location in the second sub-network plane,
wherein the network system comprises a plurality of partitions, each partition comprising at least one of the sub-network planes,
wherein at least two of the partitions run different jobs in an independent manner,
wherein a type of one or more end nodes to which each of edge switches in the first sub-network plane is connected is a same type as one or more end nodes to which a corresponding edge switch in the second sub-network plane is connected, and the first and second sub-network planes belong to a same partition of said plurality of partitions,
wherein a type of one or more end nodes to which an edge switch in the third sub-network plane is connected is different from a type of one or more end nodes to which a corresponding edge switch in the first sub-network plane is connected, and the first and third sub-network planes belong to different partitions of said plurality of partitions.

2. The network system of claim 1, wherein each of the sub-network planes includes a HyperX network topology.

3. The network system of claim 1, wherein a maximum number of the sub-network planes that can be interconnected in the network system is equal to or smaller than a number of ports of each global switch.

4. The network system of claim 1, wherein the network system is scaled up by interconnecting a new sub-network plane having a same network topology as each of the sub-network planes, and at least one edge switch of the new sub-network plane is connected to the first global switch of the network system.

5. The system of claim 1, wherein some of the N ports of each of the edge switches are connected to other end nodes, and others of the N ports are connected to other edge switches in a same sub-network plane, and others of the N ports are connected to at least one of the one or more global switches.

6. A network system, comprising:
a plurality of HyperX network planes each having an i×j grid of edge switches, where i≥2 and j≥2, the sub-network planes comprising a first HyperX network plane, a second HyperX network plane, and second HyperX network plane, the HyperX network planes interconnected through the first through L-th global switches; and first through L-th global switches, where L≥2, the first global switch connecting a first edge switch at a first location in one of the HyperX network planes and a second edge switch at a corresponding first location in another one of the HyperX network planes, the first edge switch having a direct link with an edge switch in each of column and row directions with respect to the first edge switch in the one of the HyperX network planes, wherein the network system comprises a plurality of partitions, each partition comprising at least one of the HyperX network planes, wherein at least two of the partitions run different jobs in an independent manner, wherein a type of one or more end nodes to which each of edge switches in the first HyperX network plane is connected is a same type as one or more end nodes to which a corresponding edge switch in the second HyperX network plane is connected, and the first and second HyperX network planes belong to a same partition of said plurality of partitions, wherein a type of one or more end nodes to which an edge switch in the third HyperX network plane is connected is different from a type of one or more end nodes to which a corresponding edge switch in the first HyperX network plane is connected, and the first and third HyperX network planes belong to different partitions said plurality of partitions.

7. The network system of claim 6, wherein, in each of the HyperX network planes, some of the N ports of each of the edge switches are connected to other end nodes, and others of the N ports are connected to other edge switches in the same HyperX network plane, and others of the N ports are connected to at least one of the first through L-th global switches.

8. The network system of claim 6, wherein the second global switch of the first through L-th global switches connects the first edge switch and the second edge switch.

9. The network system of claim 6, wherein the network system is scaled up by interconnecting a new HyperX network plane having a same network topology as each of the HyperX network planes, wherein an edge switch placed at a corresponding first location in the new HyperX network plane is connected to the first global switch.

10. The network system of claim 6, wherein a maximum number of the HyperX network planes interconnected in the network system is equal to or smaller than a number of ports of each global switch.

11. The network of claim 7, wherein the type of the one or more end nodes corresponds to one of a type of compute nodes and a type of input/output (I/O) nodes, wherein all the edge switches of the first HyperX network plane are connected to one of the I/O nodes and the compute nodes, and all the edge switches of the third HyperX network plane are connected to another of the I/O nodes and the compute nodes.

12. A method for building up a network system by interconnecting a plurality of HyperX network planes through a plurality of global switches, comprising:

building the plurality of HyperX network planes comprising a first HyperX network plane, a second HyperX network plane, and second HyperX network plane, each of which includes i×j grid of edge switches, wherein links between the edge switches in each column direction of the i×j grid are interconnected in an all-to-all manner, and links between the edge switches in each row direction of the i×j grid are interconnected in an all-to-all manner;

connecting, through a first global switch of the plurality of global switches, at least one edge switch at a first location in one of the HyperX network planes to at least another global switch at a corresponding first location in another one of the HyperX network planes; and comprising partitioning the network system into a plurality of partitions, each partition comprising at least one of the HyperX network planes, wherein at least two of the partitions run different jobs in an independent manner wherein a type of one or more end nodes to which each of edge switches in the first HyperX network plane is connected is a same type as one or more end nodes to which a corresponding edge switch in the second HyperX network plane is connected, and the first and second HyperX network planes belong to a same partition of said plurality of partitions, wherein a type of one or more end nodes to which an edge switch in the third HyperX network plane is connected is different from a type of one or more end nodes to which a corresponding edge switch in the first HyperX network plane is connected, and the first and third HyperX network planes belong to different partitions of said plurality of partitions.

13. The method of claim 12, further comprising connecting, through a second global switch of the plurality of global switches, the at least one edge switch at the first location in one of the HyperX network planes and the at least another global switch at the corresponding first location in another one of the HyperX network planes.

14. The method of claim 12, wherein each of the global switches has M ports, a number of the HyperX network planes in the network system is M.

15. The method of claim 12, wherein each of the global switches includes M ports, a number of the HyperX network planes in the network system is M/2.

16. The method of claim 12, further comprising scaling up a size of the network system by interconnecting a new HyperX network plane having a same network topology as each of the HyperX network planes, wherein an edge switch placed at a corresponding first location in the new HyperX network plane is connected to the first global switch.

* * * * *